United States Patent
Bhongale et al.

(10) Patent No.: US 10,072,498 B2
(45) Date of Patent: Sep. 11, 2018

(54) PROVIDING HIGH POWER OPTICAL PULSES OVER LONG DISTANCES

(71) Applicant: Halliburton Energy Services, Inc., Houston, TX (US)

(72) Inventors: Satyan Gopal Bhongale, Cypress, TX (US); Daniel Joshua Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/527,673

(22) PCT Filed: May 11, 2016

(86) PCT No.: PCT/US2016/031834
§ 371 (c)(1),
(2) Date: May 17, 2017

(87) PCT Pub. No.: WO2017/196317
PCT Pub. Date: Nov. 16, 2017

(65) Prior Publication Data
US 2018/0202286 A1   Jul. 19, 2018

(51) Int. Cl.
*E21B 47/12* (2012.01)
*E21B 47/00* (2012.01)
(Continued)

(52) U.S. Cl.
CPC ........ *E21B 47/123* (2013.01); *E21B 47/0006* (2013.01); *E21B 47/065* (2013.01);
(Continued)

(58) Field of Classification Search
CPC . G01V 8/10; G01J 3/0218; G01J 3/28; G01K 11/32; G08C 23/06; E21B 49/08;
(Continued)

(56) References Cited

U.S. PATENT DOCUMENTS 6,526,208 B1   2/2003   King et al.
7,042,631 B2   5/2006   Smith et al.
(Continued)

FOREIGN PATENT DOCUMENTS

WO   2015030821 A1   3/2015

OTHER PUBLICATIONS

Maram, Reza, et al. "Noiseless intensity amplification of repetitive signals by coherent addition using the temporal Talbot effect." Nature communications 5 (2014).
(Continued)

*Primary Examiner* — An T Nguyen
(74) *Attorney, Agent, or Firm* — McGuire Woods LLP (57) ABSTRACT

The disclosed embodiments include a method and fiber optic cable to provide optical pulses for sensing, and an optical telemetry system. In one embodiment, the method includes sequentially transmitting a plurality of optical pulses through a first end of a first optical fiber disposed in a first section of a wellbore. The plurality of optical pulses is combined into a combined optical pulse at a distance from the first end of the first optical fiber. The method further includes transmitting the combined optical pulse through a second optical fiber disposed in a second section of the wellbore, and the second optical fiber includes a second dispersion value, where an absolute value of the first dispersion value is greater than an absolute value of the second dispersion value.

20 Claims, 6 Drawing Sheets

(51) Int. Cl.
*G01K 11/32* (2006.01)
*H04B 10/2537* (2013.01)
*G08C 23/06* (2006.01)
*E21B 47/06* (2012.01)
*G01D 5/353* (2006.01)
*G01L 1/24* (2006.01)
*H04B 10/54* (2013.01)

(52) U.S. Cl.
CPC .............. *G01K 11/32* (2013.01); *G08C 23/06* (2013.01); *H04B 10/2537* (2013.01); *E21B 47/06* (2013.01); *G01D 5/35361* (2013.01); *G01D 5/35364* (2013.01); *G01K 11/3206* (2013.01); *G01K 2011/322* (2013.01); *G01K 2011/324* (2013.01); *G01L 1/246* (2013.01); *H04B 10/541* (2013.01)

(58) Field of Classification Search
CPC .... E21B 27/123; E21B 47/06; E21B 47/0006; E21B 47/065; H04B 10/2537; H04B 10/541; G01D 5/35361; G01D 5/3536
See application file for complete search history.

(56) References Cited

U.S. PATENT DOCUMENTS

| | | | |
|---|---|---|---|
| 7,522,798 | B2 | 4/2009 | Okuno |
| 8,125,704 | B2 | 2/2012 | Mielke et al. |
| 8,380,031 | B2 | 2/2013 | Bickham et al. |
| 2001/0021291 | A1 | 9/2001 | Miyakawa et al. |
| 2009/0224936 | A1 | 9/2009 | Vannuffelen et al. |
| 2011/0262150 | A1 | 10/2011 | Inoue et al. |
| 2012/0237205 | A1 | 9/2012 | Duncan et al. |
| 2013/0094011 | A1 | 4/2013 | Barry et al. |
| 2017/0183958 | A1* | 6/2017 | Zeng ..................... E21B 47/123 |
| 2017/0248734 | A1* | 8/2017 | Barfoot .................... G01V 8/10 |

OTHER PUBLICATIONS

Zolotovskiĭ, I. O., and D. I. Sementsov. "Dynamics of optical pulses in periodic nonlinear fibers." Optics and Spectroscopy 92.2 (2002): 272-276.

International Search Report and Written Opinion dated Jan. 3, 2017; International PCT Application No. PCT/US2016/031834.

* cited by examiner

PROVIDING HIGH POWER OPTICAL PULSES OVER LONG DISTANCES

BACKGROUND

The present disclosure relates generally to methods, optical telemetry systems, and fiber optic cables for providing optical pulses.

An optical telemetry system is sometimes deployed in a wellbore to facilitate optical communications with downhole tools and devices and for optical sensing of a downhole environment. In some embodiments, the optical telemetry system may include an optical source, fiber optic cables, optical sensors, and an optical receiver. Optical pulses emitted from the optical source travel through one or more optical fibers of the optical telemetry system, where the optical pulses are used to measure a downhole environment such as, but not limited to, the temperature, pressure, vibration, displacement, velocity, torque, acceleration, and other properties of the downhole environment. The optical pulses may also be used to transmit signals indicative of downhole measurements as well as signals indicative of other data obtained by downhole tools to the surface.

Wellbores are often several thousand feet deep and may extend horizontally for several miles. As such, optical pulses emitted from the source emitter may travel through several miles of optical fiber before reaching a region where measurements are made. However, as the optical pulses travel through the optical fibers, the optical pulses experience a signal intensity loss proportional to the distance traveled. Further, optical pulses emitted at the surface are power limited due to safety concerns.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to optical telemetry and sensing systems and methods to provide optical pulses along a fiber optic cable. An optical telemetry system deployed in a wellbore is often used to transmit optical pulses several miles across the depth of the wellbore. In some embodiments, when an optical pulse having an approximately constant frequency is transmitted through one end of an optical fiber, sub-images and self-images (replications) of the optical pulse are formed as the optical pulse traverses through the optical fiber. This effect is known as the Talbot effect, where self-images of a waveform of the optical pulse are formed at integer multiples of a Talbot length. Further, at certain fractions of an integer of a Talbot length (e.g., $\frac{1}{2}$, $\frac{2}{3}$, $\frac{3}{4}$, etc.), multiple copies of sub-images of the original waveform are formed. For example, at a distance of $\frac{2}{3}$ of a Talbot length from the end of the optical fiber, three sub-images of the original waveform are formed, where a specific phase relationship exists between the three images. At approximately one Talbot length, the original waveform of the optical pulse is replicated.

The foregoing waveform dispersion effect may also be utilized to combine a plurality of optical pulses into a combined pulse. In some embodiments, an optical modulator of the telemetry system modifies the phase of each optical pulse before the optical pulse is transmitted to the optical fiber to make the optical pulse appear as though the optical pulse is propagated from a distance of 0 Talbot length and reaches the first end of the optical fiber at a distance where multiple sub-images of an original waveform would be formed. According to the foregoing example, if three sub-images of a waveform at a distance $\frac{2}{3}$ of a Talbot length may be combined into a single waveform approximately identical to the original waveform at a distance of one Talbot length, then three optical pulses that pass through a first end of the optical fiber and have waveforms approximately identical to the three sub-images may be combined into an optical pulse having a waveform approximately identical to the original waveform at approximately $\frac{1}{3}$ Talbot length from the first end of the optical fiber. The systems and processes to modify waveforms of optical pulses and to combine the optical pulses to form a combined optical pulse are discussed in further detail in the paragraphs below. Thus, by manipulating diffraction and dispersion effects of optical pulses propagating through optical fibers, multiple optical pulses each having a small signal intensity may be transmitted at the surface and may be combined into a combined pulse at a desired location, where the signal intensity of the combined pulse would not cause undesired effects (such as due to nonlinearity) or pose a problem or danger. In some cases, an optical pulse having a threshold level of power is desired at the desired location. However sending such power from the surface may introduce unwanted effects due to propagation in the optical fiber. This issue may be circumvented by sending multiple optical pulses, each optical pulse having a level of power lower than the threshold, and each optical pulse having a predetermined phase relation with respect to the other optical pulses. The optical pulses may then be combined to form a single combined optical pulse at the desired location where the threshold level of power is desired.

The combined optical pulse is transmitted through a second optical fiber having a lower dispersion value relative to the first optical fiber, to a sensing region where the combined pulse is utilized by the second optical fiber or by sensors proximate to the second optical fiber to measure one or more measurements, such as, but not limited to the temperature, pressure, vibration, displacement, velocity, torque, and acceleration of the sensing region. In some embodiments, the second optical fiber is connected to a modulator (such as a downhole modulator) operable to further modulate optical pulses traversing through the second optical fiber to block the optical pulses or to allow the optical pulses to return up-hole. The blocking or transmitting an optical pulse up-hole may be used to indicate a digital bit of 0 or 1, respectively. As such, the modulator may utilize successive optical pulses to transmit a binary code by blocking or by allowing transmission of some of the optical pulses up-hole. In other embodiments, the modulator is operable to modify the signal intensity of optical pulses to perform high leveled coding schemes such as, but not limited to 4-pulse-amplitude modulation (PAM), 8-PAM, 4-quadrature amplitude modulation (QAM), 8-QAM, or a different level of QAM or PAM. In further embodiments, the modulator is operable to modulate the phase of the optical pulses to perform different phase modulation coding schemes.

Figure 1A:
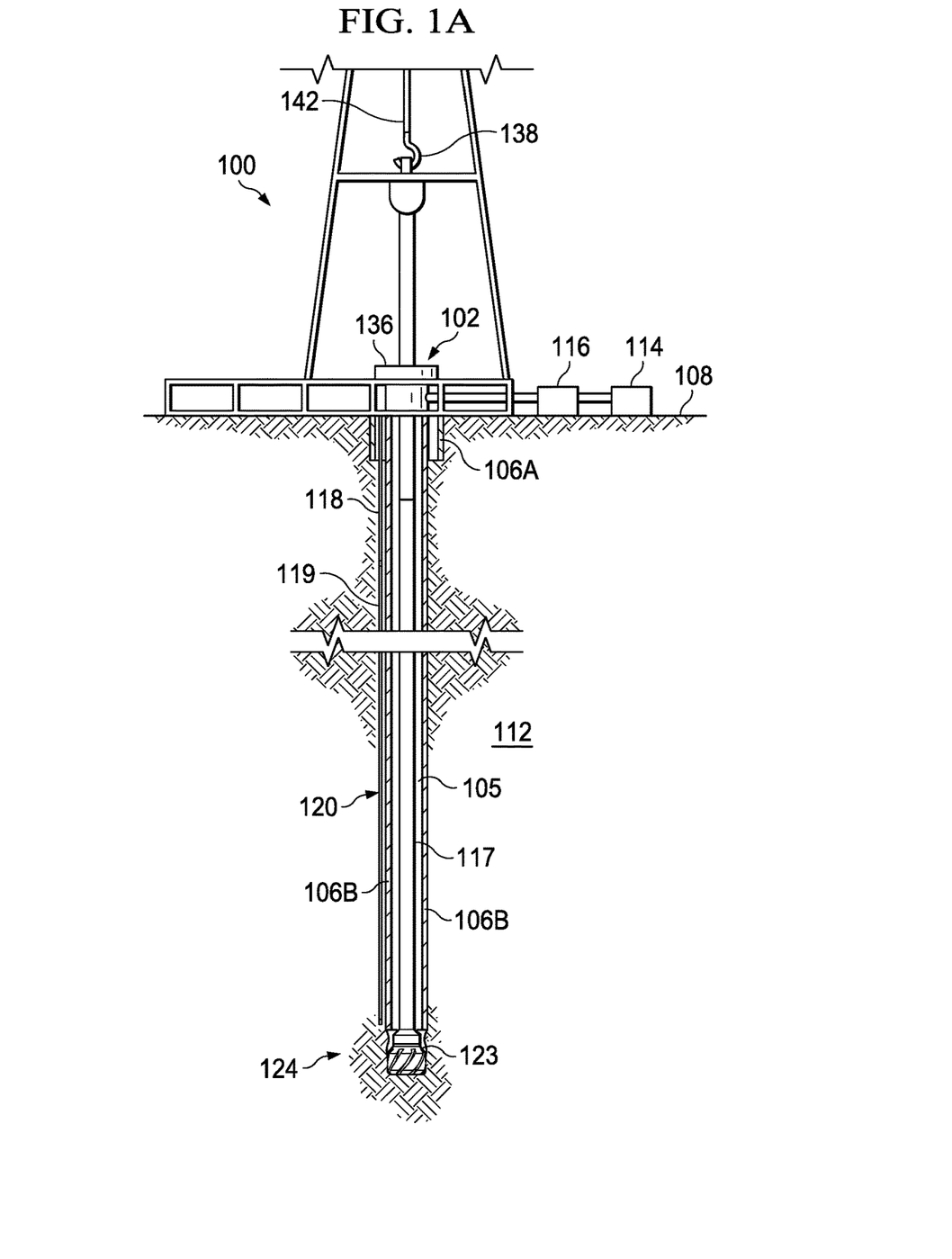
FIG. 1A illustrates a schematic view of a well environment in which an optical telemetry system is deployed in a wellbore.

Now turning to the figures, FIG. 1A illustrates a schematic view of a well environment 100 in which an optical telemetry system is deployed in a wellbore 105 of well 102. In the embodiment of FIG. 1A, the wellbore 105 is encased by a surface casing 106A and a production casing 106B, and extends from a surface 108 of the well 102 to or through a subterranean formation 112. A fiber optic cable 120 is deployed along the production casing 106B down the wellbore 105. A hook 138, cable 142, traveling block (not shown), and hoist (not shown) are provided to lower a string 117 carrying a tool 123 through a wellhead 136 down the wellbore 105, or to lift the string 117 up from the wellbore 105. In some embodiments, the string 117 is a wireline tool string, a slickline tool string, a drill string, or another type of tool string operable to deploy the tool 123. In other embodiments, the string 117 is a tube that provides an annulus for wellbore fluids to travel down the wellbore 105 and for hydrocarbon resources to travel up the wellbore 105.

The fiber optic cable 120 is operable to provide semi-permanent and/or permanent monitoring of the downhole environment. In one of such embodiments, the fiber optic cable 120 is used to perform distributed acoustic sensing of the tool 123 and the downhole environment proximate to the fiber optic cable 120. In another one of such embodiments, the fiber optic cable is deployed with one or more sensors (not shown) and a modulator (not shown). In such embodiment, optical pulses indicative of measurements made by the one or more sensors are re-transmitted by the modulator towards the surface 108.

Figure 1B:
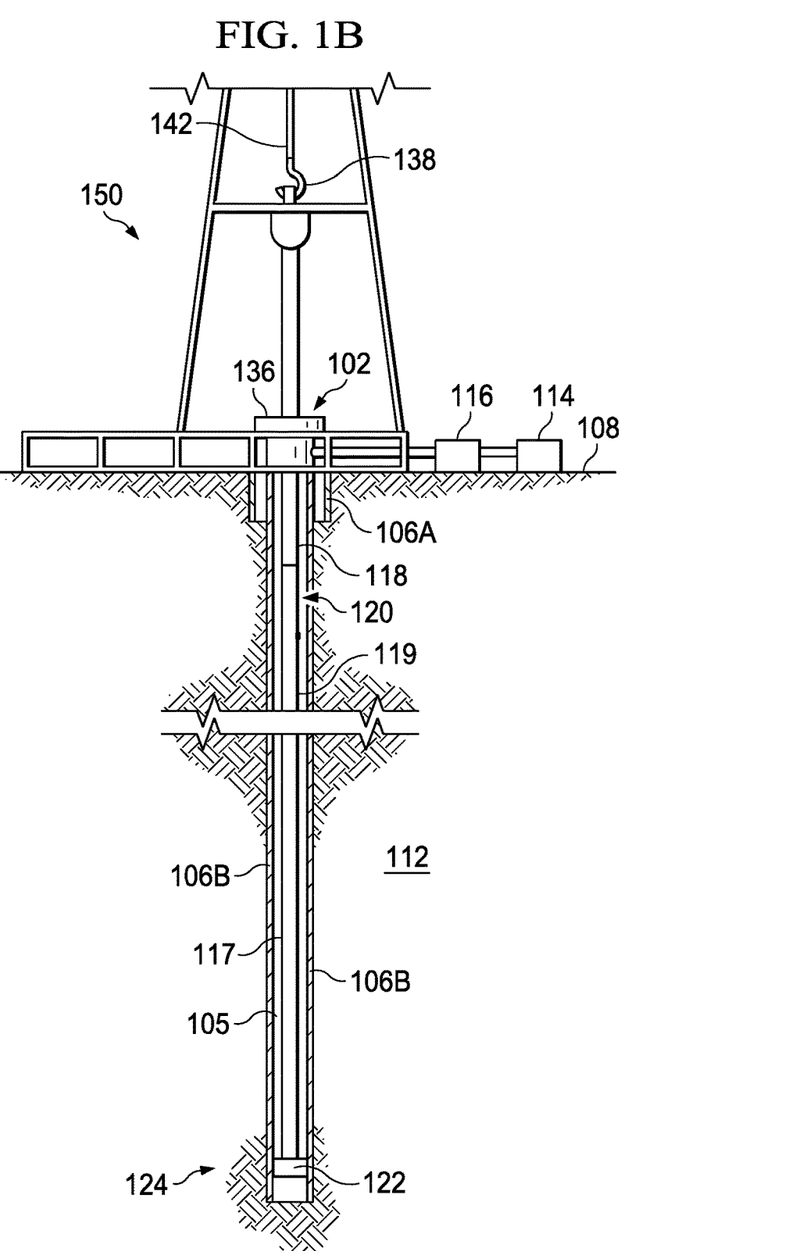
FIG. 1B illustrates a schematic view of another well environment in which an optical telemetry system is deployed in a wellbore.

FIG. 1B illustrates a schematic view of a wireline logging environment 150 in which the fiber optic cable 120 is deployed in the wellbore 105 of the well 102. In the embodiment of FIG. 1B, the hook 138, cable 142, traveling block, and hoist are provided to lower the fiber optic cable 120 through the wellhead 136 down the wellbore 105 or to lift the fiber optic cable 120 up from the wellbore 105. In some embodiments, distributed acoustic sensing, distributed temperature sensing, distributed and distributed strain and temperature sensing operations may be directly performed by the fiber optical cable 120. Additional descriptions of utilizing the fiber optic cable 120 to perform the foregoing operations are described in the paragraphs below. In other embodiments, one or more sensors (not shown) are deployed on or proximate the fiber optic cable 120 and are operable to measure the downhole environment and to provide optical pulses indicative of the downhole environment to the fiber optic cable 120. A modulator 122 is deployed proximate to the sensing region 124 to modulate the optical pulses to either re-transmit the optical pulses or to block the optical pulses. Additional descriptions of optical sensing are provided in the paragraphs below.

The fiber optic cable 120 may also be deployed in other production or preparation environments, such as logging while drilling and measurement while drilling environments. In some embodiments, the fiber optic cable 120 is deployed with or embedded in the string 117. In other embodiments, the fiber optic cable 120 is enclosed in a casing and is deployed downhole through a feedthrough system in combination with spools and slip rings. Further, although FIGS. 1A and 1B illustrate deploying the fiber optic cable 120 in downhole environments of on shore wells, the fiber optic cable 120 may also be deployed in subsea environments such as in offshore wells, along subterranean formations (underground fiber optic cable lines), along the seafloor (underwater optic cable lines), or above ground (where fiber optic cable lines are suspended by multiple tower or poles).

In the embodiments of FIGS. 1A and 1B, an optical source 114 operable to emit a variety of optical pulses and a modulator 116 operable to modulate waveform properties of optical pulses emitted by the optical source 114 are deployed proximate to a first end of a first optical fiber 118 of the fiber optic cable 120. The first optical fiber 118 extends from the surface 108 and is connected to an end of a second optical fiber 119 of the fiber optic cable 120. The second optical fiber 119 is deployed further downhole relative to the first optical fiber 118, such that a portion of the second optical fiber 119 is deployed proximate to a sensing region 124.

Figure 2:
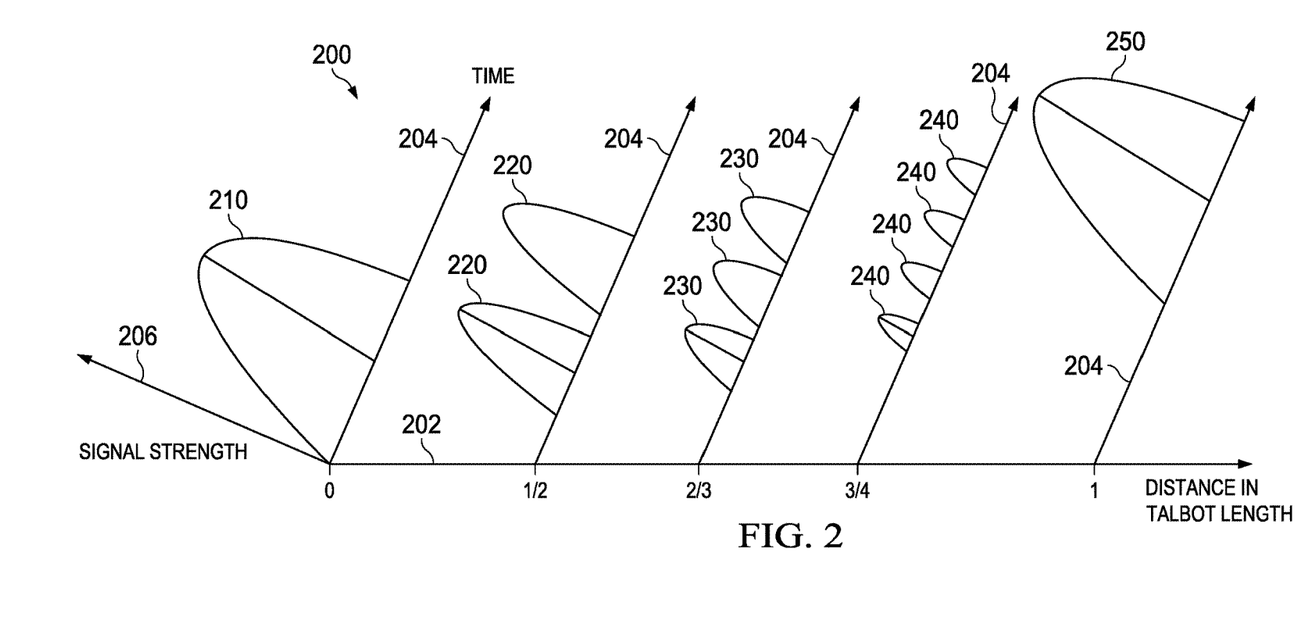
FIG. 2 illustrates a perspective view of a graph illustrating dispersive propagations of a waveform of an optical pulses over a distance of one Talbot length.

FIG. 2 illustrates a perspective view of a graph 200 that illustrates dispersive propagations of a waveform 210 of an optical pulse traversing through the first optical fiber 118 over a distance of a Talbot length. A Talbot length is determined by the following formula: $T^2/(2\pi/\beta_2|)$, where T is a repetition period of the pulse train with identical phases for each pulse, $\beta_2$ is the dispersion coefficient of the first optical fiber 118.

In the embodiment of FIG. 2, axis 202 illustrates distance, axis 204 illustrates time, and axis 206 illustrates signal intensity. At distance 0, an optical pulse waveform 210 having a specific wavelength passes through a first end of the first optical fiber 118. As the optical pulse traverses through the first optical fiber 118, sub-images of the waveform 210 are formed at various fractions of a Talbot length. For example, at ½ Talbot length, the optical pulse is represented by a waveform 220 having two pulses and having one half the repetition period of the waveform 210, where the pulses have a relative phase difference of $\pi/2$. At ⅔ Talbot length, the optical pulse is represented by a waveform 230 having three pulses and having one third the repetition period of the waveform 210, where the pulses have a phase difference of $2\pi/3$. At ¾ Talbot length, the optical pulse is represented a waveform 240 having four pulses and having one fourth the repetition period of the waveform 210. Each pulse the pulses in the foregoing example has a definite phase. At other fractions of Talbot lengths represented by the expression $$\frac{x-1}{x},$$

where x is an integer greater than or equal to 2, the optical pulse is represented by a waveform having x number of pulses each a period approximately 1/x the period of the original waveform 210 with the phase of the nth pulse given by the general formula $$\phi_n = \left(\frac{x-1}{x}\right)\pi n^2.$$

At a distance of approximately one Talbot length, the waveform 250 of the optical pulse is approximately a replication of the original waveform 210. As the optical pulse continues to propagate through the first optical fiber 118, the optical pulse may be represented by waveforms 210 or 250 at different integer multiples of one Talbot length and may be represented by waveforms 220, 230, or 240 at ½, ⅔, or ¾ of one Talbot length plus an integer multiple of one Talbot length, respectively.

Due to power, nonlinearity of the fiber, and/or safety concerns discussed herein, the signal intensity of an optical pulse indicated by the amplitude of the waveform 210 may be greater than an acceptable threshold level. As such, it may not be suitable/permissible to transmit an optical pulse having an amplitude approximately equal to the amplitude of the waveform 210. However, a sequence of repetitive optical pulses with predetermined phase relations given by the formula provided in the previous paragraph, where each optical pulse has an amplitude less than the acceptable threshold level may be transmitted through the first optical fiber 118 to be combined to form a combined optical pulse having a waveform substantially identical to the waveform 210.

In one embodiment, a sequence of repetitive optical pulses that together form a waveform substantially identical to the waveform 240 both in phase and amplitude may be transmitted through the first optical fiber 118. As illustrated in FIG. 2, the dispersion properties of the first optical fiber 118 may combine the sequence of repetitive optical pulses that together form the waveform 240 into a combined optical pulse having the waveform 250 at a downhole location where the signal strength of the combined optical pulse would not pose a problem discussed herein. In some embodiments, the combined optical pulse has a signal intensity that is approximately m times greater than the signal intensity of each individual optical pulse, where m is equal to the number of optical pulses transmitted through the first optical fiber 118 that combine to form one single pulse.

In some embodiments, an optical modulator modifies the phase of each of the sequence of repetitive optical pulses before the optical pulse is transmitted to the first optical fiber 118 to make the optical pulse appear as though the optical pulse propagates from a distance of 0 Talbot length and passes through the first end of the first optical fiber 118 at a distance of $$\frac{x-1}{x}$$

Talbot length, where x is an integer than or equal to 2. In one of such embodiments, the optical modulator shifts a phase of each of the sequence of repetitive optical pulses relative to a phase of a previous optical pulse by $\phi_n$, which is approximately equal to $\pi n^2(m-1)/m$, where n is a pulse number of an optical pulse of the plurality of optical pulses that is transmitted, and m is the desired amplification factor and is equal to the number of pulses that one would like to combine into one pulse when propagated through the optical fiber 118.

In some embodiments, the distance from the first end of the first optical fiber 118 to a location where the sequence of repetitive optical pulses are combined to form a waveform substantially similar to the waveform 250 is determined by the following equation: $mT^2/(2\pi|\beta_2|)$, where T is equal to a repetition period of the plurality of optical pulses, $\beta_2$ is equal to a dispersion value of the first optical fiber 118, and m is the amplification factor or the number of optical pulses to be combined to form one combined optical pulse after propagating through the fiber 118. In one of such embodiments, the sequence of repetitive optical pulses may also be combined to have a waveform substantially similar to the waveform 250 at a distance approximately equal to an integer multiple of the Talbot length of the first optical fiber 118 plus $mT^2/(2\pi|\beta_2|)$.

Figure 3A:
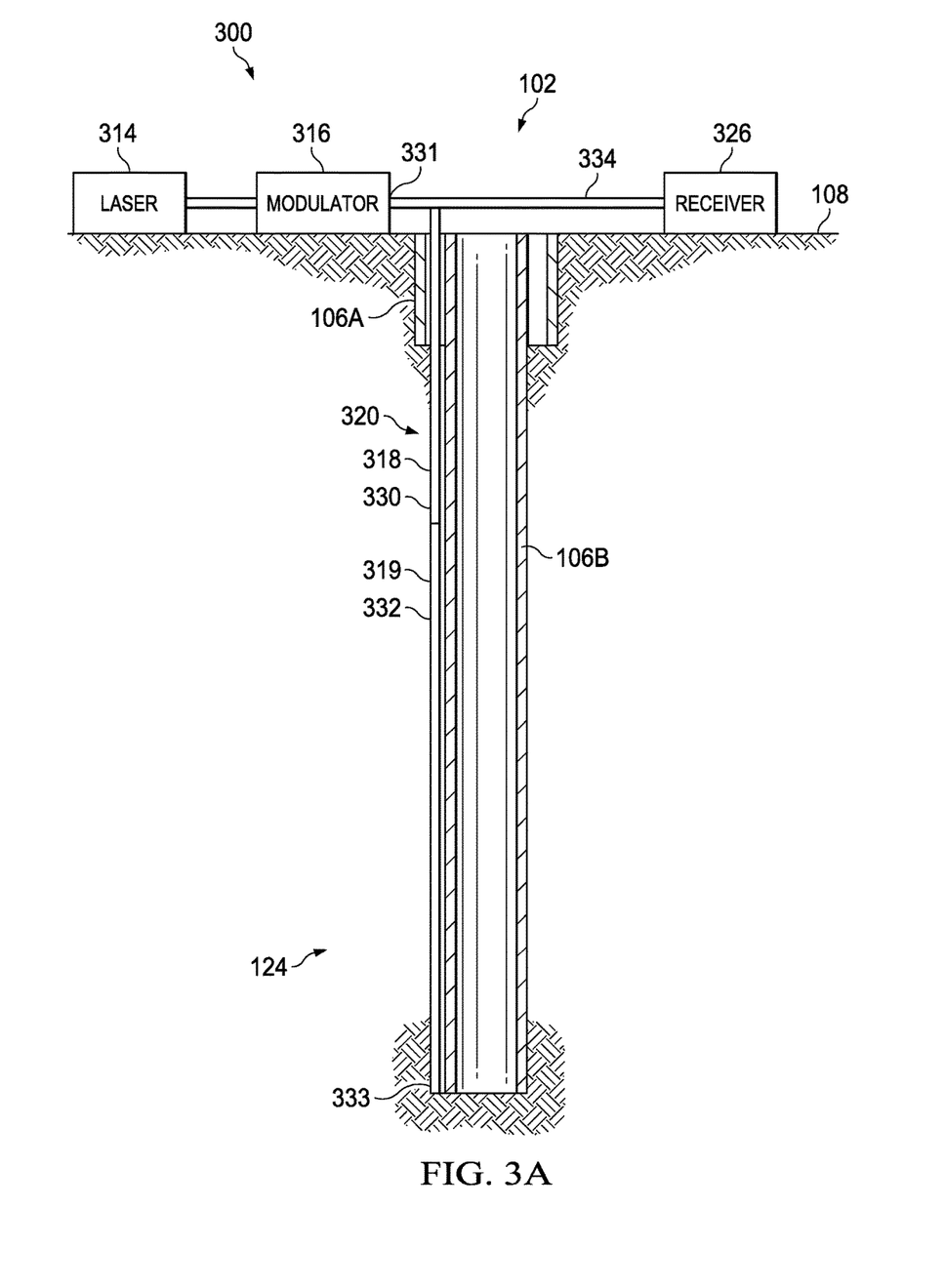
FIG. 3A illustrates a schematic side view of an optical telemetry system deployed in the well environment of FIG. 1.

As an exemplary embodiment, FIG. 3A illustrates a schematic side view of an optical telemetry system 300 deployed in the environment 100 of FIG. 1A. The telemetry system 300 includes a laser 314 and a modulator 316 deployed at the surface 108 of the well 102. A fiber optic cable 320 having a first section 318 and a second section 319 is deployed along the deployment casing 106B. The first section 318 of the fiber optic cable includes a first optical fiber 330 operable to receive an optical pulse from the laser 314 or the modulator 316. The first section 318 also includes a third optical fiber 334 connected to an optical receiver 326, which includes any system and hardware and/or software component thereof that is operable to receive optical pulses traversing through the fiber optic cable 320. The second section 319 includes a second optical fiber 332 deployed downhole such that a portion of the second optical fiber 332 is proximate to the sensing region 124.

In some embodiments, the laser 314 sequentially transmits a plurality of optical pulses to the modulator 316. The modulator 316 may be an electro-optic modulator which modulates each of the plurality of optical pulses so that each optical pulse is phase shifted from a previous optical pulse by $\phi_n$, where $$\phi_n = \frac{(m-1)\pi n^2}{m},$$

in which n is a pulse number of an optical pulse of the plurality of optical pulses that is transmitted, m is a total number of the plurality optical pulses transmitted through the first optical fiber 330, and is also the desired gain factor. Each modulated optical pulse passes through a first end 331 of the first optical fiber 330 and travels downhole.

At a distance of $mT^2/(2\pi\beta_2)$, where T is equal to the repetition of the plurality of optical pulses, $\beta_2$ is equal to a dispersion value of the first optical fiber 330, and m is the total number of the optical pulses transmitted through the first optical fiber 330, also approximately equal to the achieved gain, the dispersion properties of the first optical fiber 330 causes the plurality of modulated optical pulses to combine into a single combined pulse. The plurality of optical pulses also combine into the combined pulse at distances approximately an integer multiple of the Talbot length plus $mT^2/(\pi|\beta|)$ from the first end 331 of the first optical fiber 330. The combined pulse has a signal strength approximately m times the signal strength of each individual optical pulse, where m is equal to the number of optical pulses transmitted through the first end 331 of the first section 318 of the fiber optic cable 320.

The combined optical pulse passes from the first optical fiber 330 into the second optical fiber 332. The second optical fiber 332 has a lower dispersion value relative to the first optical fiber to preserve the waveform properties of the combined optical pulse for distributed acoustics sensing, distributed temperature sensing, and/or distributed temperature and strain sensing operations described herein. In some embodiments, the absolute value of the dispersion value of the second optical fiber 332 is lower than the absolute value of the dispersion value of the first optical fiber 330. In some embodiments, such as shown in FIG. 3A, the second optical fiber 332 utilizes the combined optical pulse to perform distributed sensing of one or more wellbore conditions such as the temperature, pressure, vibration, displacement, velocity, angle, torque, and acceleration of the sensing region 124. In one of such embodiments, distributed acoustic sensing is achieved by utilizing Rayleigh back scattering in the second optical fiber 332. In another one of such embodiments, distributed temperature sensing is achieved by utilizing Raman back scattering in the second optical fiber 332. In a further embodiment, distributed strain and temperature sensing is achieved by utilizing Brillouin back scattering in the second optical fiber 332. In a further embodiment, distributed temperature sensing is achieved by utilizing a combination of one or more of Rayleigh scattering, Raman scattering, and Brillouin back scattering in the second optical fiber 332. Optical pulses that are backscattered are transmitted to the surface 108 via the second optical fiber 332, the first optical fiber 330, and the third optical fiber 334.

Figure 3B:
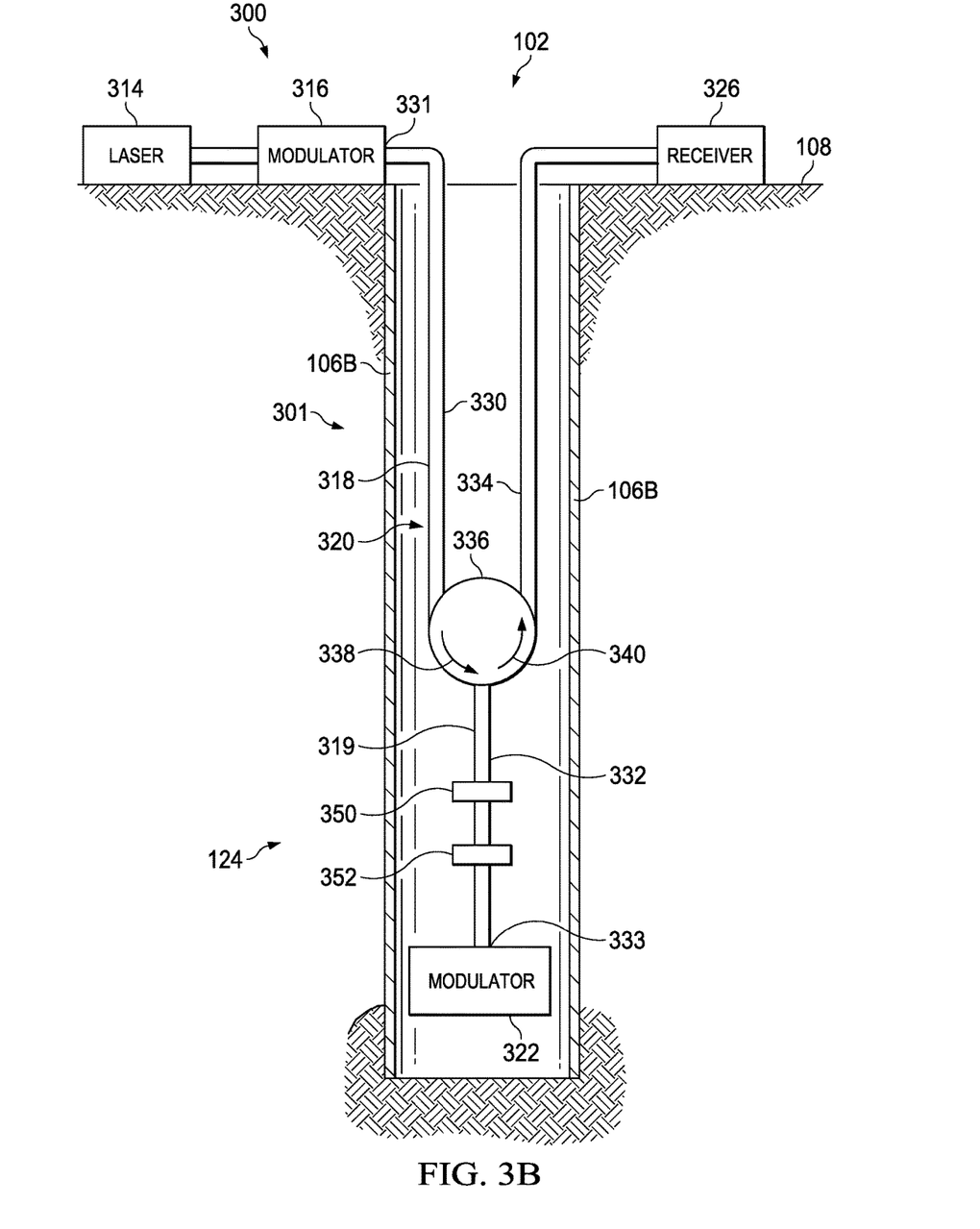
FIG. 3B illustrates a schematic side view of another optical telemetry system deployed in the well environment of FIG. 1.

FIG. 3B illustrates a schematic side view of an optical telemetry system 301 deployed in the environment 150 of FIG. 1B, where the fiber optic cable 320 is deployed inside the deployment casing 106B. The first section 318 of the fiber optic cable 320 includes a first optical fiber 330 operable to receive an optical pulse from the laser 314 or the modulator 316. The first section 318 also includes a third optical fiber 334 connected to an optical receiver 326. The second section 319 includes a second optical fiber 332 deployed downhole such that a portion of the second optical fiber 332 is proximate to the sensing region 124, where sensors 350 and 352 are deployed. The fiber optic cable 320 also includes an optical circulator 336, a coupler with a filter (not shown), and/or a coupler with an isolator (not shown) operable to transmit optical pulses from the first optical fiber 330 to the second optical fiber 332, and from the second optical fiber 332 to the third optical fiber 334.

As stated herein, multiple optical pulses traveling through the first optical fiber 330 are combined into a combined optical pulse. The combined optical pulse passes from the first optical fiber 330, through the optical circulator 336 in a direction indicated by arrow 338, and into the second optical fiber 332.

In some embodiments, the second optical fiber 332 provides the combined optical pulse to the sensors 350 and 352, such as fiber bragg gratings, deployed at the sensing region 124 to measure the one or more conditions of the sensing region 124, such as strain or temperature. In further embodiments, the sensors 350 and 352 may be external to the fiber and provide data input (in the form of electrical voltage or current waveforms) to a downhole modulator 322 for telemetry to the surface. Although FIG. 3B illustrates two sensors 350 and 352 deployed in the sensing region 124, a different number of sensors may be deployed to provide measurements of the sensing region 124.

In some embodiments, the combined optical pulse continues to traverse the second optical fiber 332 until said combined pulse reaches a second end 333 of second optical fiber 332, where the combined pulse is modulated by the modulator 322. In one of such embodiments, the modulator 322 modulates the received combined optical pulse to transmit the combined optical pulse up-hole through the second optical fiber 332. In another one of such embodiments, the modulator 322 modifies the combined optical pulse to alter transmission of the optical pulse up-hole.

In some embodiments, the combined optical pulse is modulated by the modulator 322 for transmission of uplink data. In one of such embodiments, a plurality of combined optical pulses are transmitted downhole, where a combined optical pulse that is blocked by the modulator 322 is an indication of a digital bit of 0, and where a combined optical pulse that is transmitted up-hole is an indication of a digital bit of 1. As such, by blocking or allowing combined optical pulses to traverse up-hole, binary codes indicative of conditions of the sensing region or indicative of other data obtained by the sensors 350 and 352 may be transmitted up-hole to the receiver 326. The modulator 322 is also operable to modify the phase, pulse width, and/or intensity of the optical pulse and provide the modified optical pulse through the second optical fiber 332 up-hole. As stated herein, by partially blocking the optical pulses or by phase shifting the optical pulses, higher order codes, as such 4-PAM, 8-PAM, 4-QAM, 8-QAM and the like may also be used to facilitate communication. As such, the modified optical pulse may be used to generate one or more messages to the receiver 326.

In the embodiment illustrated in FIG. 3B, combined optical pulses that travel up-hole traverse through the second optical fiber 332, the optical circulator 336 in a direction indicated by arrow 340, and the third optical fiber 334, until the combined pulses reach the receiver 326.

Figure 4A:
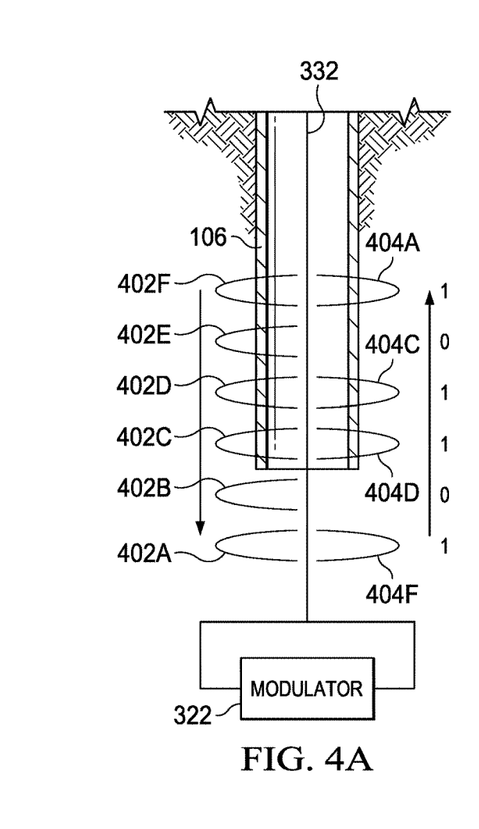
FIG. 4A illustrates a schematic side view of a downhole environment in which optical pulses transmitted downhole through the second optical fiber of FIG. 3B are blocked by the modulator of FIG. 3B or transmitted up-hole through the second optical fiber.
Figure 4B:
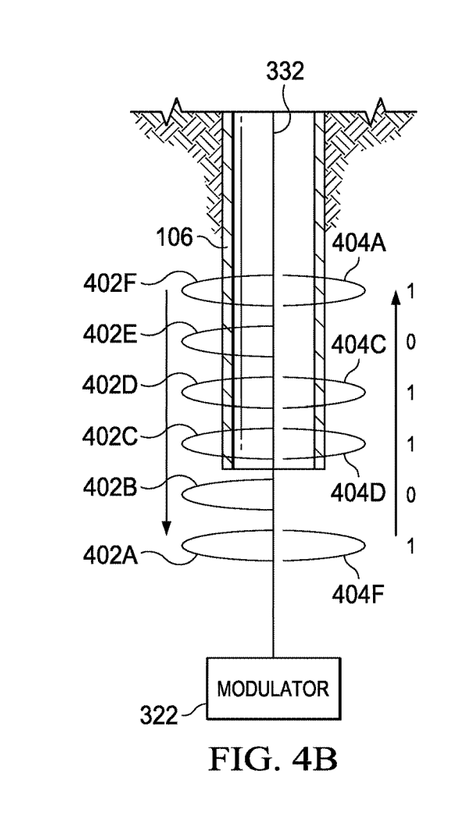
FIG. 4B illustrates another schematic side view of a downhole environment in which optical pulses transmitted downhole through the second optical fiber of FIG. 3B are blocked by the modulator of FIG. 3B or transmitted up-hole through the second optical fiber.
Figure 4C:
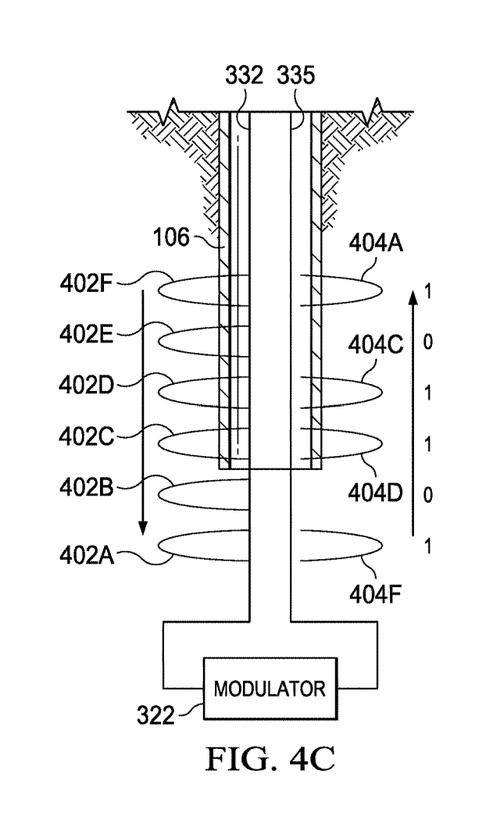
FIG. 4C illustrates a further schematic side view of a downhole environment in which optical pulses transmitted downhole through the second optical fiber of FIG. 3B are blocked by the modulator of FIG. 3B or transmitted up-hole through a second optical fiber.

FIGS. 4A-4C illustrate schematic side views of a downhole environment in which optical pulses transmitted downhole are blocked by the modulator 322 of FIG. 3B or are allowed to be transmitted up-hole. In the embodiments of FIGS. 4A-4C, the second optical fiber 332 is connected to the modulator 322.

In the embodiment of FIG. 4A, optical pulses traveling towards the modulator 322 are directed by a circulator (not shown), coupler (not shown), or splitter (not shown) to the modulator 322. Optical pulses 402B and 402E are modified by the modulator 322 through phase modulation, amplitude modulation or another modulation technique. Optical pulses 402A, 402C, 402D, and 402F are not modified and are transmitted up-hole through the second optical fiber 332. In some embodiments, optical pulses that pass through the modulator 322 may represent a digital bit of 1 (if not modified), whereas optical pulses that are modified by the modulator 322 may represent a digital bit of 0. As such, by modifying optical pulses 402B and 402E and allowing optical pulses 402A, 402C, 402D, and 402F to pass through unchanged, a binary code of 101101, may be transmitted up-hole. Moreover, a variety of binary codes indicative of the downhole environment or carrying messages from the sensors 350 and 352 as well as other downhole devices and tools may be formed and transmitted up-hole. Although FIG. 4A illustrates the modulator 322 modulating the optical pulses to form binary codes, the modulator 322 may also modulate the phase, pulse length, polarization, and signal intensity of the optical pulses to perform higher ordered encoding schemes. In the embodiment of FIG. 4B, the second optical fiber 332, a switchable reflector, such as a Faraday rotator mirror with a controllable polarizer or an attenuator may be deployed to reflect or direct the optical pulses 402A, 402C, 402D, and 402F up-hole. In the embodiment of FIG. 4C, a second optical fiber 335 is dedicated to transmitting optical pulses up-hole. In other embodiments, a variety of other configurations of optic fibers and down-hole modulators may be deployed to provide uplink transmission.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a method to provide optical pulses along a fiber optic cable, the method comprising sequentially transmitting a plurality of optical pulses through a first end of a first optical fiber disposed in a first section of a wellbore and having a first dispersion value, wherein the plurality of optical pulses combine into a combined optical pulse at a distance from the first end of the first optical fiber; and transmitting the combined optical pulse through a second optical fiber disposed in a second section of the wellbore, the second optical fiber having a second dispersion value, wherein an absolute value of the first dispersion value is greater than an absolute value of the second dispersion value.

Clause 2, the method of clause 1, wherein sequentially transmitting the plurality of optical pulses comprises transmitting each optical pulse of the plurality of optical pulses at approximately a first signal intensity.

Clause 3, the method of clause 1 or 2, wherein the combined optical pulse has a signal intensity that is approximately m times the first signal intensity, and wherein m is equal to a total number of the plurality of optical pulses transmitted through the first optical fiber to be combined into one pulse.

Clause 4, the method of any combination of clauses 1-3, further comprising modulating each of the plurality of optical pulses, wherein each optical pulse of the plurality of optical pulses is phase shifted from a previous optical pulse by a value $\phi_n$.

Clause 5, the method of an combination of clauses 1-4, wherein $\phi_n$ is approximately equal to $(m-1)\pi n^2/m$, wherein n is a pulse number of an optical pulse of the plurality of optical pulses that is transmitted, and wherein m is a total number of the plurality optical pulse transmitted through the first optical fiber.

Clause 6, the method of any combination of clauses 1-5, further comprising: determining the distance from the first end of the optical fiber to a location where the plurality of optical pulses are combined.

Clause 7, the method of any combination of clauses 1-6, wherein the distance is approximately equal to $mT^2/(2\pi|\beta_2|)$, wherein T is equal to a repetition period of the plurality of optical pulses, wherein $\beta_2$ is equal to a dispersion value of the first optical fiber, and wherein m is a total number of pulses to be combined to form the combined optical pulse.

Clause 8, the method of any combination of clauses 1-7, further comprising receiving the combined optical pulse at a downhole location; and modulating the received combined optical pulse to modify the combined optical pulse to alter transmission of the combined optical pulse to a receiver, wherein the combined optical pulse is modified to indicate a digital bit of 0, and wherein the combined optical pulse is transmitted unmodified to the receiver to indicate a digital bit of 1.

Clause 9, the method of any combination of clauses 1-8, further comprising transmitting the combined optical pulse through the second optical fiber and a third optical fiber disposed in the first section of the wellbore to the receiver.

Clause 10, the method of any combination of clauses 1-8, further comprising receiving the combined optical pulse at a downhole location, performing a pulse-amplitude modulation of a signal intensity the received combined optical pulse to form a modulated optical pulse; and transmitting the modulated optical pulse to a receiver.

Clause 11, the method of any combination of clauses 1-10, further comprising performing at least one of a distributed acoustic sensing, a distributed temperature sensing, and a distributed strain and temperature sensing of a property of the wellbore along a length of a portion of the second optical fiber, wherein the combined optical pulse is used to perform at least one of the distributed acoustic sensing, the distributed temperature sensing, and the distributed strain and temperature sensing of the property of the wellbore.

Clause 12, the method of any combination of clauses 1-11, further comprising utilizing at least one of Rayleigh back scattering, Raman back scattering, and Brillouin back scattering techniques to perform at least one of the distributed acoustic sensing, the distributed temperature sensing, and the distributed strain and temperature sensing of the wellbore property.

Clause 13, the method of any combination of clauses 1-12, further comprising providing the combined optical pulse to a sensor deployed proximate the second optical fiber, wherein the combined optical pulse is utilized by the sensor to measure at least one property of the wellbore.

Clause 14, an optical telemetry system comprising a laser source operable to sequentially emit a plurality of repeating optical pulses; a modulator disposed proximate to a surface and operable to modulate a phase shift of each of the plurality of optical pulses relative to a phase of a previously emitted optical pulse of the plurality of optical pulses; a first optical fiber having a first dispersion value and disposed in a first section of a wellbore, the first optical fiber operable to receive the plurality of optical pulses through a first end of the first optical fiber, wherein the plurality of optical pulses is combined to form a combined pulse at a first distance from the first end of the first optical fiber; and a second optical fiber having a second dispersion value and disposed in a second section of the wellbore, the second optical fiber operable to receive the combined optical pulse; and a modulator operable to modulate the combined optical pulse for transmission of an uplink data, wherein an absolute value of the first dispersion value is greater than an absolute value of the second dispersion value.

Clause 15, the system of clause 14, wherein the combined optical pulse traverses from the second optical fiber without being modulated by the modulator, and wherein the combined optical pulse is indicative of a digital bit of 1 of a digital bit of the uplink data.

Clause 16, the system of clause 14 or 15, wherein the modulator is further operable to modulate the combined optical pulse to alter transmission of the combined optical pulse, wherein the modulated combined optical pulse is indicative of a digital bit of 0 of a digital bit of the uplink data.

Clause 17, the system of any combination of clauses 14-16, wherein sequentially transmitting the plurality of optical pulses comprises transmitting each optical pulse of the plurality of optical pulses at approximately a first signal intensity.

Clause 18, the system of any combination of clauses 14-17, wherein a portion of the second optical fiber is used for distributed acoustic sensing.

Clause 19, a fiber optic cable for providing optical pulses, the fiber optic cable comprising a first section having a first optical fiber, the first optical fiber having a first dispersion value and disposed in a first section of a well; and a second optical fiber having a second optical fiber, the second section having a second dispersion value and disposed in a second section of the well, wherein an absolute value of the first dispersion value is greater than an absolute value of the second dispersion value, wherein the first optical fiber is operable to combine a plurality optical pulses having a phase relationship and having approximately identical amplitudes into a combined optical pulse, and wherein the second optical fiber is operable to transmit the combined optical pulse to a region where the combined optical pulse is utilized to perform a measurement of the region.

Clause 20, the fiber optic cable of clause 19, wherein the first section comprises a plurality of optical fibers, wherein the first optical fiber is operable to transmit the combined optical pulse from a surface location to the second section, and wherein the second optical fiber is operable to transmit the combined optical pulse to at least another one of the plurality of optical fibers.

As used herein, approximately equal to x or having an approximate value of x is defined to include the exact value of x. Further, approximately identical to is defined to include identical to.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. A method to provide optical pulses along a fiber optic cable, the method comprising:
   sequentially transmitting a plurality of optical pulses through a first end of a first optical fiber disposed in a first section of a wellbore and having a first dispersion value, wherein the plurality of optical pulses combine into a combined optical pulse at a distance from the first end of the first optical fiber; and
   transmitting the combined optical pulse through a second optical fiber disposed in a second section of the wellbore, the second optical fiber having a second dispersion value,
   wherein an absolute value of the first dispersion value is greater than an absolute value of the second dispersion value.

2. The method of claim 1, wherein sequentially transmitting the plurality of optical pulses comprises transmitting each optical pulse of the plurality of optical pulses at approximately a first signal intensity.

3. The method of claim 2, wherein the combined optical pulse has a signal intensity that is approximately m times the first signal intensity, and wherein m is equal to a total number of the plurality of optical pulses transmitted through the first optical fiber that are combined into the combined optical pulse.

4. The method of claim 1, further comprising modulating each of the plurality of optical pulses, wherein each optical pulse of the plurality of optical pulses is phase shifted from a previous optical pulse by a value $\phi_n$.

5. The method of claim 4, wherein $\phi_n$ is approximately equal to $\pi n^2(m-1)/m$, wherein n is a pulse number of an optical pulse of the plurality of optical pulses that is transmitted, and wherein m is a total number of the plurality optical pulse transmitted through the first optical fiber.

6. The method of claim 1, further comprising: determining the distance from the first end of the optical fiber to a location where the plurality of optical pulses are combined.

7. The method of claim 6, wherein the distance is approximately equal to $mT^2/(2\pi|\beta_2|)$, wherein T is equal to a repetition period of the plurality of optical pulses, wherein $\beta_2$ is equal to a dispersion value of the first optical fiber, and wherein m is a total number of optical pulses transmitted through the first optical fiber to be combined into form the combined optical pulse.

8. The method of claim 1, further comprising:
   receiving the combined optical pulse at a downhole location; and modulating the received combined optical pulse to modify the combined optical pulse to alter transmission of the combined optical pulse to a receiver, wherein the combined optical pulse is modified to indicate a digital bit of 0, and wherein the combined optical pulse is transmitted unmodified to the receiver to indicate a digital bit of 1.

9. The method of claim 8, further comprising transmitting the combined optical pulse through the second optical fiber and a third optical fiber disposed in the first section of the wellbore to the receiver.

10. The method of claim 1, further comprising:
receiving the combined optical pulse at a downhole location;
performing a pulse-amplitude modulation of a signal intensity modifying the received combined optical pulse to form a modulated optical pulse; and
transmitting the modulated optical pulse to a receiver.

11. The method of claim 1, further comprising:
performing at least one of a distributed acoustic sensing, a distributed temperature sensing, and a distributed strain and temperature sensing of a wellbore property along a length of a portion of the second optical fiber,
wherein the combined optical pulse is used to perform at least one of the distributed acoustic sensing, the distributed temperature sensing, and the distributed strain and temperature sensing of the wellbore property.

12. The method of claim 11, further comprising utilizing at least one of Rayleigh back scattering, Raman back scattering, and Brillouin back scattering techniques to perform at least one of the distributed acoustic sensing, the distributed temperature sensing, and the distributed strain and temperature sensing of the wellbore property.

13. The method of claim 1, Further comprising:
providing the combined optical pulse to a sensor deployed proximate the second optical fiber,
wherein the combined optical pulse is utilized by the sensor to measure at least one property of the wellbore.

14. An optical telemetry system comprising:
a laser source operable to sequentially emit a plurality of repeating optical pulses;
a modulator disposed proximate to a surface and operable to modulate a phase shift of each of the plurality of optical pulses relative to a phase of a previously emitted optical pulse of the plurality of optical pulses;
a first optical fiber having a first dispersion value and disposed in a first section of a wellbore, the first optical fiber operable to receive the plurality of optical pulses through a first end of the first optical fiber, wherein the plurality of optical pulses is combined to form a combined pulse at a first distance from the first end of the first optical fiber; and
a second optical fiber having a second dispersion value and disposed in a second section of the wellbore, the second optical fiber operable to receive the combined optical pulse; and
a modulator operable to modulate the combined optical pulse for transmission of an uplink data,
wherein an absolute value of the first dispersion value is greater than an absolute value of the second dispersion value.

15. The system of claim 14, wherein the combined optical pulse traverses from the second optical fiber without being modulated by the modulator, and wherein the combined optical pulse is indicative of a digital bit of 1 of a digital bit of the uplink data.

16. The system of claim 14, wherein the modulator is further operable to modulate the combined optical pulse to alter transmission of the combined optical pulse up-hole, wherein the modulated combined optical pulse is indicative of a digital bit of 0 of a digital bit of the uplink data.

17. The system of claim 14, wherein sequentially transmitting the plurality of optical pulses comprises transmitting each optical pulse of the plurality of optical pulses at approximately a first signal intensity.

18. The system of claim 14, wherein a portion of the second optical fiber is used for distributed acoustic sensing.

19. A fiber optic cable for providing optical pulses, the fiber optic cable comprising:
a first section having a first optical fiber, the first optical fiber having a first dispersion value and disposed in a first section of a well; and
a second section having a second optical fiber, the second optical fiber having a second dispersion value and disposed in a second section of the well,
wherein an absolute value of the first dispersion value is greater than an absolute value of the second dispersion value,
wherein the first optical fiber is operable to combine a plurality of optical pulses having a phase relationship and having approximately identical amplitudes into a combined optical pulse, and
wherein the second optical fiber is operable to transmit the combined optical pulse to a region where the combined optical pulse is utilized to perform a measurement of the region.

20. The fiber optic cable of claim 19, wherein the first section comprises a plurality of optical fibers, wherein the first optical fiber is operable to transmit the combined optical pulse from a surface location to the second optical fiber, and wherein the second optical fiber is operable to transmit the combined optical pulse to at least another one of the plurality of optical fibers.

* * * * *